Nov. 5, 1963  A. I. MIHALAKIS  3,109,451

CHECK VALVE

Filed Jan. 23, 1961

INVENTOR.
AGIS I. MIHALAKIS

BY

ATTORNEYS.

United States Patent Office 3,109,451
Patented Nov. 5, 1963

3,109,451
CHECK VALVE
Agis I. Mihalakis, Northridge, Calif., assignor, by mesne assignments, to AIM Pump Corporation, Canoga Park, Calif., a corporation of California
Filed Jan. 23, 1961, Ser. No. 84,390
2 Claims. (Cl. 137—516.11)

This invention relates to valves and is particularly directed to an improved form of check valve assembly.

An important object of this invention is to provide a check valve assembly having a single moving part with low inertia characteristics for rapid movement to and from open and closed position.

Another object is to provide a device of this type particularly adapted for use with air or gas and useful in service as interstage or outlet valves for compressors.

Another object is to provide a device of this type having a minimum of restriction when open, in order to secure maximum fluid flow while providing a tight seal against reverse flow.

Another object is to provide a device of this type in in which the moving element flexes from a curve to a flat shape when moving from open to closed position.

Another object is to provide a rugged, dependable device of the type described, characterized by trouble-free operation and long service life.

Other and more detailed objects and advantages of this invention will appear hereinafter.

Figure 1:
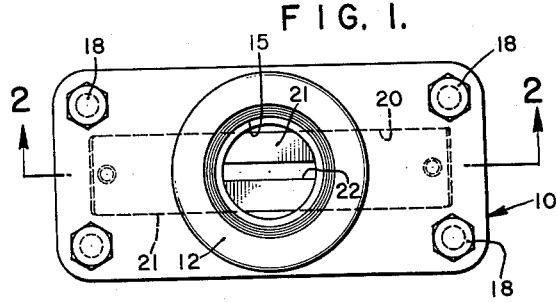
FIGURE 1 is a top plan view showing a preferred embodiment of this invention.

Referring now to the drawings, the housing designated generally 10 includes an inlet part 11 and an outlet part 12. The inlet part 11 is provided with a threaded socket communicating with an inlet opening 14. Similarly, the outlet part 12 is provided with a threaded socket communicating with an outlet opening 16. A stationary plate 17 may comprise an integral part of the inlet member 11 or, as shown in the drawings, may comprise a separate part clamped between the housing parts 11 and 12 by means of the threaded fastenings 18.

Figure 2:
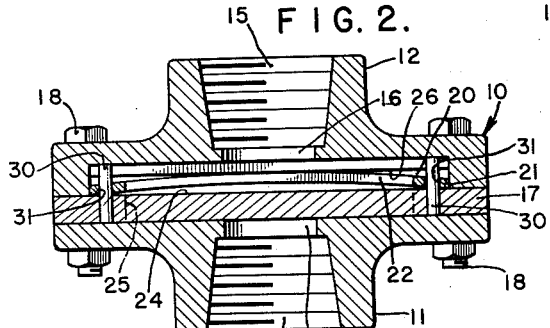
FIGURE 2 is a sectional side elevation taken substantially on the lines 2—2 of FIGURE 1, the arched valve element being in open position.

An elongated cavity 20 is provided within the housing 10 and a curved flexible valve element 21 is positioned within this cavity 20. The valve element 21 is generally rectangular in shape and is normally arched, having its curvature along the longitudinal dimension thereof. Valve element 21 is provided with an elongated slot 22 centrally and symmetrically positioned therein. As shown in FIGURE 2, the ends of the flexible curved valve element 21 rest on the flat upper surface 24 of the stationary plate 17. The plate 17 is provided with elongated apertures 25 which are out of registry with the slot 22 of the flexible valve element 17. Parallel ribs 26 on the outlet part 12 project into the cavity and form shoulders limiting upward movement of the valve element 21 away from the flat sealing surface 24. The upper portion of the curved element 21 normally contacts these shoulders. A central elongated passage 27 is formed in the outlet member 12 between ribs 26 and this passage is in registry with the central slot 22 of the movable valve 21. Additional passages 28 are provided in the outlet part 12 along the outer boundaries of the ribs 26. The passages 27 and 28 communicate with the outlet opening 16. Similarly, the apertures 25 in the stationary plate 17 communicate with the inlet opening 14.

Guide means may be provided for guiding the ends of the flexible valve element 21, and as shown in the drawings and this means may comprise guide pins 30 which are fixed in the plate 17. The pins 30 are loosely received in guide openings 31 provided in the valve 21.

The check valve device as disclosed herein is adapted for use in connection with the compressor device shown in my co-pending application, Serial No. 707,042, filed January 6, 1958, now Patent Number 2,926,677. When so used, the inlet part 11 and the outlet part 12 are modified in exterior shape for incorporation into the design of the particular unit, and the valves serve as interstage check valves as well as the outlet valve for the final stage.

When the parts are in open position as shown in FIGURE 2, the ends of the arched valve element 21 rest on the flat sealing surface 24 of the stationary plate 17, and the central portion contacts the ribs 26.

Figure 3:
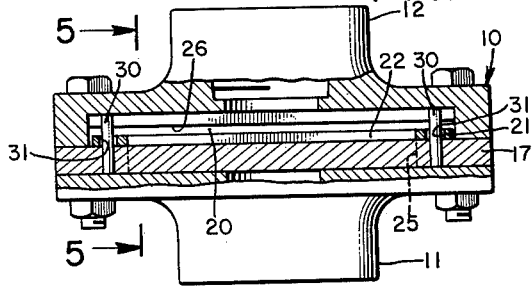
FIGURE 3 is a sectional view similar to FIGURE 2, the valve element being in closed position.
Figure 4:
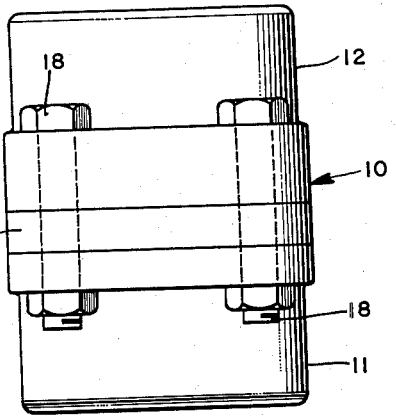
FIGURE 4 is an end elevation.
Figure 5:
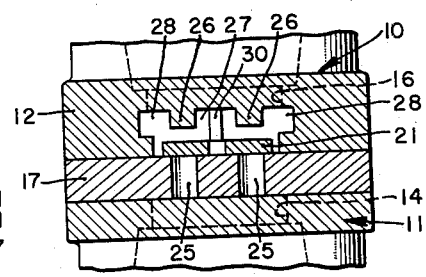
FIGURE 5 is a sectional detail taken substantially on the lines 5—5 of FIGURE 3, and showing the parts in closed position.
Figure 6:
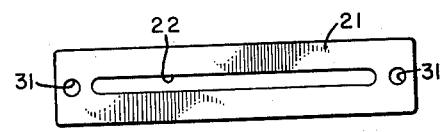
FIGURE 6 is a plan view of the movable valve plate.
Figure 7:
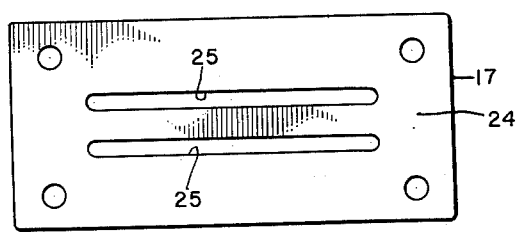
FIGURE 7 is a plan view of the stationary plate.

Whenever back pressure in the outlet 15 exceeds the fluid pressure in the inlet 14, the arched spring leaf valve element 21 flattens out against the upper surface of the stationary plate 17, as shown in FIGURE 3. When the velocity of fluid entering the inlet opening 14 reaches a predetermined magnitude, the ends of the arched valve element move away from the surface 24 and come to rest against the shoulders provided by the parallel ribs 26 on the outlet member 12. The parts are then in extreme open position. In this position, free unrestricted flow of fluid takes place from the inlet opening 14 through the apertures 25 in the stationary plate 17 into the central cavity 20. The fluid then flows through the slot 22 in the movable valve element 21 as well as around the side edges of the valve plate 21. The fluid enters the passageways 27 and 28 in the outlet part 12 and passes to the outlet opening 16.

Whenever back pressure in the outlet 15 exceeds the fluid pressure in the inlet 14, the arched spring leaf valve element 21 flattens out against the upper surface of the stationary plate 17, as shown in FIGURE 3.

It has been found that the valve assembly also functions with good results with the arched valve element 21 installed in inverted position, that is, with its convex surface in contact with the stationary plate 17. The flexing action takes place as described above to form sealing contact with the surface 24 when fluid pressure in the outlet 15 exceeds the fluid pressure in the inlet 14.

The valve element 21 has very low inertia and flexes rapidly between open and closed positions. A tight seal is formed in closed position and free, unrestricted flow occurs in open position.

Having fully described my invention, it is to be understood that I am not to be limited to the details herein set forth but that my invention is of the full scope of the appended claims.

I claim:
1. A check valve, comprising: a housing structure defining an elongated, rectangular, flat cavity, and inlet and outlet openings intersecting opposite flat sides of said cavity centrally thereof, said cavity extending beyond said openings along a longitudinal axis; a valve seat plate covering the inlet side of said cavity and the intersecting inlet opening therein; said valve seat plate having at least a pair of elongated inlet slots having a longitudinal dimension greater than that of said inlet opening and com- municating at their central portions with said inlet opening and forming passages for lateral flow to their extremities; elongated ribs extending from the outlet opening side of said cavity in registry with said slots; a rectangular valve element in the form of an arched flexible strip having at least one longitudinal slot therein, said slot having a longitudinal dimension greater than that of either said inlet or outlet openings; and forming on opposite sides of said slots elongated valve faces, said valve element disposed in said cavity between said ribs and inlet slots and normally arched away from said inlet slots, said valve faces dimensioned to cover and seal said inlet slots upon flattening said valve element against said valve seat plate.

2. A check valve, comprising: a first housing member having an elongated rectangular recess, a pair of ribs extending longitudinally in said recess, and an outlet port communicating with said recess, said recess extending beyond said outlet port along its longitudinal axis; a rectangular seat plate covering said recess and defining a pair of elongated inlet slots disposed in registry with said ribs, said plate forming between and around said slots valve seating faces; a second housing member backing said valve plate and having an inlet port communicating with said recess through the slots in said valve seat plate, said inlet slots having a longitudinal dimension greater than that of said inlet port; and a normally arched, flexible, valve strip of uniform thickness disposed in said recess between said ribs and inlet slots, said valve strip defining a central slot having a longitudinal dimension greater than that of said outlet port and having sealing faces on opposite sides thereof, for coacting with the sealing faces of said valve plate when said valve strip is flattened against said valve plate.

References Cited in the file of this patent

UNITED STATES PATENTS

| | | |
|---|---|---|
| 1,177,291 | Trautmann | Mar. 28, 1916 |
| 1,402,082 | Moran | Jan. 3, 1922 |
| 1,957,867 | Rike | May 8, 1934 |
| 2,195,292 | Albertson | Mar. 26, 1940 |
| 2,497,906 | Peters | Feb. 21, 1950 |
| 2,615,675 | Mellert | Oct. 28, 1952 |
| 2,943,638 | Prucha | July 5, 1960 |

FOREIGN PATENTS

| | | |
|---|---|---|
| 753,258 | Germany | Mar. 3, 1940 |